United States Patent [19]

Behrens

[11] 3,975,324

[45] Aug. 17, 1976

[54] NON-HYDROSCOPIC ZINC HALIDE COMPOSITIONS

[75] Inventor: Rudolf Adolf Behrens, Sparta, N.J.

[73] Assignee: American Cyanamid Company, Stamford, Conn.

[22] Filed: Aug. 19, 1971

[21] Appl. No.: 173,324

[52] U.S. Cl. .................... 260/23 TN; 260/77.5 CR; 260/79.5 C; 260/79.5 P
[51] Int. Cl.$^2$........................................... C08G 18/67
[58] Field of Search ............... 260/23 TN, 77.5 CR, 260/79.5 C, 79.5 P, 414, 429.9

[56] References Cited
UNITED STATES PATENTS

| | | |
|---|---|---|
| 2,809,121 | 10/1957 | Davis et al. .................... 260/429.9 |
| 3,124,475 | 3/1964 | Fischer et al. .................... 260/414 |
| 3,230,199 | 1/1966 | Muhlhausen et al. ................ 260/75 |
| 3,231,592 | 1/1966 | McCord............................ 260/414 |
| 3,256,188 | 6/1966 | Papayannopoulos et al.... 260/429.9 |
| 3,448,171 | 6/1969 | Damusis............................. 260/75 |

OTHER PUBLICATIONS

Vulcanization of Elastomers, Alliger et al., pp. 153–154, & 179, Rheinhold Publishing Co., New York, 1964.

*Primary Examiner*—Eugene C. Rzucidlo
*Attorney, Agent, or Firm*—Charles J. Fickey

[57] ABSTRACT

A process for the vulcanization of polyurethane elastomers is provided which comprises utilizing a vulcanization activator comprising a non-hygroscopic zinc halide composition.

5 Claims, No Drawings

NON-HYDROSCOPIC ZINC HALIDE COMPOSITIONS

BACKGROUND OF THE INVENTION

The high molecular weight polyurethane elastomers have a wide range of commercial utility. The long chain polyurethane elastomers have been prepared by reacting, in general, a polyester or a polyether with one or more organic diisocyanates. In the past, the utilization of these materials has been greatly curtailed due to the difficulties encountered in the storage of the elastomers in a form ready for curing. There are generally two kinds of urethane elastomer compositions, a liquid and a solid. The liquid is mixed with curing agents which extend and/or cross link. It is then poured into a mold and cured. While this is very convenient and has found wide use, there is still a need for a solid elastomer which can be processed on standard rubber processing equipment.

It has been previously considered necessary to utilize a substantial excess of isocyanate to provide adequate curing properties in the polyurethane polymers. The excess isocyanate has been found to react even during storage conditions at room temperatures. It has been found necessary that elastomers formed with an excess of diisocyanate must, in general, be used promptly and with great care to facilitate their providing the proper curing properties to form the desired shaped articles. This has resulted in a marked disadvantage and has prevented, in the past, the substantial use of polyurethane polymers made in this manner in the manufacture of complex molded articles.

Alternative methods have been proposed in order to overcome this automatic curing after the preparation of the polymer. Polyurethane polymers have been manufactured with a deficiency or very slight excess of isocyanate. The substantial excess of isocyanate required for curing is added later, preferably just before the elastomer is utilized in the manufacture of a shaped article. This two step addition procedure forms an elastomer having properties which are not as good as those formed with a one step addition.

Polyurethane elastomers containing non-benzenoid unsaturation have been found suitable for curing by a sulfur curing procedure. However, considerable difficulty has been encountered in effecting a cure of these polyurethane elastomers having non-benzenoid unsaturation since the conventional sulfur curing systems which are used for natural rubbers, SBR and neoprene are not effective, the curing cycle being erratic and the times involved being much longer than is permissible for a commercial curing process.

In the sulfur-vulcanization of polyurethane elastomers containing non-benzenoid unsaturation the use of zinc halides as activating agents has been found to be highly effective. However, the use of halides as activating agents has presented problems in handling since they are extremely hygroscopic, difficult to disperse in the elastomeric material because of their crystalline nature and are highly irritating when in contact with the skin. Some of these problems have been partially overcome by the use of zinc halide co-ordination complexes of 2-mercaptobenzothiazole (MBT) or 2,2'-dithiobisbenzothiazole (MBTS). Zinc halide complexes of MBT or MBTS for use as activators in the vulcanization of unsaturated polyurethanes are disclosed in U.S. Pat. No. 2,868,798 to Kehr. Co-ordination complexes of zinc chloride and cadmium chloride with MBT or MBTS for use in the vulcanization of unsaturated polyurethanes is disclosed in U.S. Pat. No. 2,870,157 to Csendes. U.S. Pat. No. 2,846,416 discloses a process for curing polyether-based polyurethanes containing unsaturated side chains which consist of employing a zinc halide complex as described in the above patents.

The use of the above activators has not proved completely satisfactory in curing polyurethanes. The heretofore known zinc halide comlexes do not provide the desired vulcanizates and, due to the necessity of high concentrations of these activators, objectionable blooming and discolorization have resulted. These defects have serious consequences when the vulcanized polyurethane is used in white goods applications, such as in cut thread. Moreover, the prior art complexes have a low weight ratio of zinc halide since the concentration is fixed by the 1:1 complex composition. Furthermore, the complexes are tedious, difficult and expensive to form. Accordingly, there is a definite need for an activator which overcomes the objectionable features described above and which will produce the desired cure rate in a polyurethane elastomer. It is therefore the principal object of the present invention to provide such an improved activator system.

SUMMARY OF THE INVENTION

The present invention comprises zinc halide compositions which are made by forming an intimate mixture of an anhydrous zinc halide and a fatty acid or a fatty acid soap. The zinc halide compositions are essentially non-hygroscopic, easily dispersed in rubber, and are non-staining. The zinc halide compositions of this invention function effectively as activators for the sulfur-vulcanization of polyurethane elastomers.

DETAILED DESCRIPTION OF THE INVENTION

The present invention provides a method for the sulfur-vulcanization of polyurethane polymers utilizing an improved activator system. It has now been found that certain zinc halide compositions, which are made by forming an intimate mixture of an anhydrous zinc halide and a fatty acid or a fatty acid soap, provide desired cure rates, are easily dispersed in the rubber and are essentially non-hygroscopic and non-staining. The zinc halide compositions are effective activators in the sulfur-vulcanization of polyether polyurethane elastomers and polyester polyurethane elastomers.

The zinc halide compositions of the present invention have been found to be easier to make due to their ease of handling of the materials and their ease of formation and, therefore, have been found to be less expensive to produce than zinc halide activators heretofore known.

The zinc halide composition of this invention may be used as an activator for the sulfur-vulcanization of any polyester based polyurethane elastomeric material or any polyester based polyurethane elastomeric material containing pendant non-benzenoid unsaturation. While the preparation of polyurethane elastomers suitable for sulfur-vulcanization have been described in detail in the prior art, and form no part of the present invention per se, the preparation of these elastomeric materials may be mentioned here by way of illustration. Polyether based polyurethane elastomers may be prepared from a polyalkylene ether glycol, such as polytetramethylene ether glycol, having a molecular weight of from about 500 to about 10,000, by reaction with a molar excess of an organic diisocyanate, followed by reaction with a non-polymeric glycol. Any of the reactants utilized in producing a polyether based polyurethane may have present side chains containing non-benzenoid unsaturation groups.

The polyalkylene ether glycols which are useful in the preparation of the polyurethane elastomers are compounds which have the general formula $H(OR)_n OH$ wherein R is an alkylene radical and n is any whole integer sufficiently large that the glycol has a molecular weight in excess of 500. The glycols may be derived from the polymerization of cyclic ethers, such as alkylene oxides or dioxolane or by the condensation of glycols. The alkylene radicals present in the polyether glycol may be all the same or may be different. The polyalkylene ether glycols useful in this invention are polyethylene ether glycol, polypropylene ether glycol, 1,2-polydimethylethylene ether glycol and polydecamethylene ether glycol and the like. The preferred polyalkylene ether glycol is polytetramethylene ether glycol.

The polyalkylene ether glycol is reacted with a molar excess of an organic diisocyanate. Any of a wide variety of organic diisocyanates may be employed to react with the glycol in preparing these polyurethane elastomers. These elastomers may be prepared using a wide variety of organic polyisocyanates among which there are included aromatic diisocyanates such as m-phenylene diisocyanates, p-phenylene diisocyanate, 4-t-butyl-m-phenylene diisocyanate, 4-chloro-m-phenylene diisocyanate, 2,4-toluene diisocyanate, 2,6-toluene diisocyanate, 1,4-naphthalene diisocyanate, 1,5-naphthalene diisocyanate, 1,8-naphthalene diisocyanate, 2,6-naphthalene diisocyanate, p,p'-diphenyl diisocyanate, diphenylmethane-4,4'-diisocyanate, and their equivalents; aliphatic diisocyanates such as methylene diisocyanate, ethylene diisocyanate, the tri-, tetra-, penta-, hexa-, hepta-, octa-, nona- and decamethylene-alpha, omega-diisocyanates and their equivalents; and tri- and higher isocyanates, such as benzene-1,3,5-triisocyanate, toluene-2,4,6-triisocyanate, diphenyl-2,4,4'-triisocyanate and their equivalents. Mixtures of two or more of such organic isocyanates may also be employed to prepare the polyether polyurethane elastomers by reaction with the polyethers as described above utilizing procedures well known to those skilled in the art. The reaction product of the polyalkylene ether glycols with the polyisocyanates is a "prepolymer" which may then be further reacted with non-polymeric glycols. These non-polymeric glycols preferably have molecular weights below about 200. In general, it has been found that the pendant chain containing terminal non-benzenoid unsaturation may be a constituent of any of the reactants used to form the polyurethane elastomeric material. It is preferred that such pendant groups containing non-benzenoid unsaturation be introduced in the polyurethane elastomer by means of the non-polymeric glycol reactant. Non-polymeric glycols containing such pendant chains include 3-allyloxy-1,5-pentanediol, 3-(allyloxy)-1,2-propanediol, 2-[(allyloxy)methyl]-2-methyl-1,3-propanediol, 3-(o-allylphenoxy)-1,2-propanediol, 2-[(allyloxy ethyl)[-2-methyl-1,3-propanediol, 2,2'-(allylimino)-diethanol, and 3-(4-allyl-2-methoxyphenoxy)-1,2-propanediol.

As stated above, polyester based polyurethane resins may be sulfur-vulcanized by utilization of novel zinc halide compositions of this invention. Polyester based polyurethane elastomers are produced by the condensation of a polyhydric alcohol with a polycarboxylic acid or anhydride to produce the polyester and subsequently reacting the polyester with a polyisocyanate to form a polyester pre-polymer. This polyester pre-polymer is then further reacted with a non-polymeric polyol. Any one or more of the reactants utilized may contain pendant chains having non-benzenoid unsaturation. The polyester utilized in forming the elastomeric material may be prepared by the condensation of a polyhydric alcohol, generally a saturated aliphatic diol such as ethylene glycol, propanediol-1, 2, propanediol-1,3, butanediol-1,3, butanediol-1,4, pentanediol-1,2, pentanediol-1,5, hexanediol-1,3, hexanediol-1,6, diethylene glycol, dipropolyene glycol, triethylene glycol, tetramethylene glycol, and their equivalents; polyhydric alcohols containing pendant chains having non-benzenoid unsaturation, such as those described above in the preparation of polyether based polyurethanes; as well as mixtures of such diols with each other and with minor amounts of polyols having more than two hydroxyl groups, preferably aliphatic polyols such as glycerol, trimethylolethane, trimethylolpropane, pentaerythritol, sorbitol, and their equivalents, with a polycarboxylic acid or anhydride, generally a dicarboxylic acid or anhydride such as oxalic, malonic, succinic, glutaric, adipic, palmitic, suberic, sebacic, malic, phthalic, cyclohexanedicarboxylic, and their equivalents, isomers, homologs and other substituted derivatives or with mixtures of such acids with each other and with unsaturated dicarboxylic acids or anhydrides such as maleic, fumaric, citraconic, itaconic acids, and their equivalents as well as with polycarboxylic acids containing three or more carboxyl groups such as aconitic acid and the like.

The polyesters utilized in preparing the polyurethane elastomers may have molecular weights ranging from about 500 to about 10,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxyl number, e.g., from 30 to about 700. When preparing these polyesters, an excess of polyol over polycarboxylic acid or anhydride is generally used to insure that the resulting polyester chains contain sufficient amounts of reactive terminal hydroxyl groups.

Just as in the case of the polyether based polyurethane elastomers, the polyester based polyurethane elastomers may be prepared from a wide variety of polyisocyanates. The polyisocyanates used may be any one or a mixture of those described hereinabove as being utilized in the polyether based polyurethane elastomers.

The polyester based pre-polymer prepared as described above is then reacted with a non-polymeric polyol. The polyester based polyurethane elastomers suitable for sulfur-vulcanization contain pendant non-benzenoid unsaturation. Such groups may be contained in any one or more than one reactants to form the polyester based elastomer. It has been found preferable to utilize a non-polymeric polyol containing side chains having terminal non-benzenoid unsaturation as described hereinabove in the preparation of the polyether based polyurethane elastomers.

As has been mentioned above, the polyurethane polymers which are cured by sulfur-vulcanization have side chains containing terminal non-benzenoid unsaturation groups. These side chains serve as potential curing sites and it is by means of these side chains that the polymers may be cured by the sulfur curing process. There should be at least one of these side chains present for every 8,000 units of molecular weight of polymer in order to insure the presence of a sufficient number of sites so that the polymer can be effectively cured. It is to be understood that there may be more side chains present and that the number of side chains may be an excess of the number actually utilized in the curing step. On the average, it has been found preferable to have not more than about one side chain per 500 units of molecular weight of polymer.

The amount of elemental sulfur which is utilized in the sulfur-vulcanization may range from about 0.5 weight part to about 3.0 weight parts per 100 parts of the polyurethane elastomer. Considerable variation is permissible as to the amount of sulfur used and it will depend on the particular polyurethane utilized and on its desired end product. In most cases, it will be found that the preferred range is between about 0.75 weight part to about 2.0 weight parts per 100 parts of the polyurethane elastomer.

One or more standard organic accelerators of the type normally used in the vulcanization of rubber, both natural and synthetic, may be employed. These include, for example, 2-mercaptobenzothiazole, 2,2'-dithiobisbenzothiazole, 2-mercaptothiazoline, diphenylguanidine, tetramethylthiuram disulfide, zinc diethyldithiocarbamate, zinc mercaptobenzothiazole and the like. Combinations of two different accelerators may be used. In general, the total amount of standard accelerators used may range from between about 2.5 weight parts to about 7.0 weight parts per 100 parts of the polyurethane elastomer. In most cases, the preferred practice will use between 4.0 weight parts to about 5.0 weight parts per 100 parts of polyurethane elastomer.

It has been found that the process of sulfur-vulcanization of polyurethane elastomers may be greatly enhanced by the utilization of the zinc halide compositions of this invention. The zinc halide compositions of the present invention are effective at lower concentrations than the zinc halide complexes heretofore known, such as zinc halide: MBTS complexes, affording greater flexibility in vulcanization systems. Although the exact mechanism of the action of the zinc halide in the sulfur-vulcanization is not known, it has been unexpectedly found that the zinc halide composition may be utilized at lower concentrations while still affording good acceleration in the vulcanization procedure. Apparently the zinc halide in the composition of the present invention is immediately available to activate the cure as soon as mixed into the polyurethane elastomer, whereas the complexes heretofore known may first have to be decomposed to liberate the zinc halide. The slow rate of decomposition of the zinc halide compositions previously known resulted in slower rates of cure which have been observed with these systems and probably accounts for the necessity of cadmium stearate as an additional activator.

The zinc halide compositions of this invention are based on the combination of zinc halide with a fatty acid or a salt of a fatty acid. Zinc halides which may be used in this invention are zinc chloride, zinc bromide, zinc iodide and the like. The zinc halide is normally first dehydrated and comminuted by heating the material at a temperature ranging from about 75°C. to about 200°C. It is preferred to dehydrate the zinc halide by heating, at a temperature of from about 75°C. to 200°C., followed or accompanied by grinding, as for example in a ball mill. The preferred dehydration temperature is from about 100° to 150°C. Other dry ingredients which are to be incorporated into the activator composition may be intimately mixed with the zinc halide during the drying and grinding operation. These other dry ingredients may include such compounds as zinc oxide, which will prevent the zinc halide from being corrosive, or a non-hygroscopic powder such as magnesium silicate and the like; pigments, fillers, and the like.

When the finely pulverized, anhydrous zinc halide mixture is formed, liquified fatty acid or fatty acid soaps are added and the mixture is continuously mixed and ground while the fatty acid or fatty acid soap in combination with the anhydrous zinc halide cools and solidifies. The resulting zinc halide compositions have texture which may range from a paste-like solid to a fluffy powder. A specific texture will depend on the particular fatty acid or fatty acid soap used and will also depend on whether zinc oxide is incorporated into the composition. It has been found that the incorporation of zinc oxide not only prevents the zinc halide from being corrosive but also promotes the formation of a fluffy powder of the zinc halide compositions.

The fatty acids or fatty acid soaps of use in the zinc halide compositions are long chain fatty acids containing between 8 to 20 carbons, such as octanoic acid, lauric acid, myristic acid, palmitic acid, stearic acid, and the like. The fatty acid soaps as used in this invention are the salts of long chain fatty acids having 8 to 20 carbons. These soaps are the zinc, calcium, magnesium, cadmium and the like salts of the long chain fatty acids described above.

The vulcanization of polyurethane elastomers by the zinc halide composition of this invention is generally practiced by using from about 0.05 to about 0.5 part of zinc halide per 100 parts of the elastomeric material. It has been found unnecessary to use additional amounts of fatty acids such as stearic acid or fatty acid soaps as is normally used in the vulcanization recipes heretofore known since the fatty acid is present in the zinc halide composition per se. In vulcanization recipes for polyurethane elastomers it has been normal to use about 0.2 part to about 2.0 parts of fatty acid per hundred parts of elastomer. This additional ingredient has been found unnecessary since the fatty acid is present in the zinc halide composition.

The zinc halide compositions of this invention are prepared using from about 1.0 to about 10.0 parts of fatty acid or fatty acid soap per part of zinc halide. The zinc halide composition is formed by the addition, to finely pulverized, anhydrous zinc halide or zinc halide mixtures as heretofore discussed above, of liquified fatty acid or fatty acid soap. The mixture is continuously mixed and ground while the fatty acid or fatty acid soap cools and solidifies. The finely divided zinc halide, including any other powdered materials desired, for example, zinc oxide, fillers and the like, may be combined with the liquified fatty acid soap and the resultant mixture sprayed or poured into the air to form prills or beads.

When zinc oxide is added to the composition, it is added to prevent corrosion due to the zinc halide and to promote the formation of a fluffy powder. The concentration of the zinc oxide is normally used in amounts of from 1 to 3 times the amount of zinc halide.

The non-hygroscopic zinc halide compositions of this invention are added to the rubber vulcanization recipe in amounts of from about 0.5 part to about 5.0 parts per hundred parts of the elastomer. This concentration range has been found most satisfactory especially in mold cure vulcanizates. However, under certain conditions, as for example in the field of injection molding of rubber, fast cure rates are important. Similarly, where low temperature cures are desired, the above concentrations may not be sufficient. Under these circumstances, as well as others known to those skilled in the art, it may be desirable to incorporate higher concentrations of the zinc halide, such as from 2 to 10 times the amount of zinc halide composition used in mold cure vulcanizates, in order to promote faster cures.

Many sulfur-vulcanizable polyurethanes are available. Polyester and polyester-amide polyurethanes, containing sulfur-vulcanizable olefinic unsaturation and polyether-polyurethanes with sulfur-vulcanizable olefinic unsaturation may be activated by the incorporation of the zinc halide composition of this invention.

In addition to the sulfur-accelerators and the zinc halide composition, other additives and compounding ingredients may be used; these include conventional fillers, pigments, such as carbon black, clay, titanium dioxide, silica and the like.

The polyurethane elastomer, sulfur, accelerators, organic accelerators, zinc halide activator and other compounding ingredients are compounded and milled using the conventional equipment and procedures normally employed in the rubber industry. Resultant compounded elastomers are cured with conventional equipment by heating for periods of from about 5 minutes to about 180 minutes at temperatures in the range of about 210°F. to about 340°F. The length of time necessary is inversely proportional to the temperatures utilized. There is, of course, depending upon the particular polyurethane utilized, an upper limit on the temperature which may be used. The preferred temperatures employed to effect the cure range are from about 220° to 300°F.

The invention is more fully discussed in conjunction with the following illustrative examples. Therein, unless otherwise specificed, all parts and percentages are by weight and temperatures and are in degress Fahrenheit.

The following examples are provided for illustrative purposes and may include particular features of the invention. However, the examples should not be construed as limiting the invention, many variations of which are possible without departing from the spirit or scope thereof.

EXAMPLE I

Zinc chloride, 10 grams, and 30 grams zinc oxide were heated in a mortar at 150°C. for 16 hours, periodically grinding and renewing the surface exposure. When the mixture was dried, 75 parts of molten lauric acid was added to the hot solid mixture and grinding was continued while the lauric acid cooled and solidified. The resulting product was a light, fluffy powder which would not wet or cake.

EXAMPLE II

In a manner similar to Example I, 10 grams of zinc chloride and 50 grams of magnesium silicate were dried and ground into an intimate mixture. To this hot mixture was added 30 grams of zinc 2-ethyl hexoate and 50 grams of molten lauric acid, grinding as above while the fatty acids cooled and the lauric acid solidified. There was obtained a paste-like solid which would not wet out.

EXAMPLE III

In a manner similar to Example I, 25 grams of zinc chloride and 50 grams of zinc oxide were ground and dried into an intimate mixture. To this hot mixture was then added 100 grams of molten Neofat 16 (mainly palmitic acid), grinding as above while the fatty acid cooled and solidified. There was obtained a light fluffy powder similar to Example I.

EXAMPLE IV

In a manner similar to Example I, 25 grams of zinc chloride is dried and ground. To the hot, dried zinc chloride is then added 100 grams of molten zinc stearate, grinding as above while the fatty acid soap is cooled and solidified There is obtained a granular, free-flowing, non-caking powder.

EXAMPLE V

A polyester based polyurethane is prepared in the conventional manner by condensing adipic acid with an excess of a mixture containing 90 mole per cent ethylene glycol and 10 mole per cent propandiol-1,2 to form a polyester having an average molecular weight of 2000. 668.5 parts of the polyester are mixed with 34.4 parts of the monoallyl ether of glycerol and then chain extended with 96.1 parts of 80/20 toluene diisocyanate to form a polyurethane elastomer having a Mooney viscosity of 40.5.

A polyurethane base formula is prepared with the following components:

| Component | Parts |
| --- | --- |
| Polyester based polyurethane described above | 100 |
| SAF Carbon Black | 30 |
| Stearic acid | 0.5 |
| Sulfur | 2.0 |

After thorough blending, the prepared base formula is divided into five batches. Each of the five batches is mixed with curing components as shown in Table I. Example 5A, wherein zinc chloride MBTS complex and cadmium stearate accelerators are used, is shown as a comparative example.

The batches are then cured for 45 minutes at 287°F. The mechanical properties of the cured elastomers are shown in Table I.

TABLE I

| Component | 5 A | 5 B | 5 C | 5 D | 5 E |
| --- | --- | --- | --- | --- | --- |
| MBTS | 4.0 | 3.0 | 3.0 | 3.0 | 3.0 |
| MBT | 1.5 | 3.0 | 3.0 | 3.0 | 3.0 |
| CAYTUR-4[1] | 1.0 | — | — | — | — |
| Cadmium stearate | 0.5 | 0.5 | — | — | — |

TABLE I-continued

| Component | 5 A | 5 B | 5 C | 5 D | 5 E |
|---|---|---|---|---|---|
| Compn. of Ex. 1 | — | 1.15 | — | — | — |
| Compn. of Ex. 2 | — | — | 1.4 | — | — |
| Compn. of Ex. 3 | — | — | — | 1.75 | — |
| Compn. of Ex. 4 | — | — | — | — | 1.25 |
| *Mooney Scorch at 287°F.* | | | | | |
| $T_s$, minutes | 6.0 | 6.3 | 5.0 | — | 6.8 |
| T Δ 30 | 2.5 | 2.6 | 1.9 | — | 0.9 |
| *Cured 45 minutes at 287°F.* | | | | | |
| Modulus, 300% (psi) | 2225 | 2250 | 2200 | 2400 | 3250 |
| Tensile strength, psi | 4960 | 5200 | 5425 | 4900 | 5650 |
| Elongation (%) | 490 | 530 | 525 | 530 | 500 |
| Hardness (Shore A) | 77 | 76 | 76 | 75 | 78 |
| *Rheological Properties at 287°F. (Monsanto Rheometer)* | | | | | |
| 95% Maximum Torque[2] | 100 | 97 | 91 | 83 | 102 |
| Cure rate | 3.4 | 3.4 | 4.8 | 5.4 | 10.6 |

[1]Zinc chloride-MBTS Complex
[2]Dyanamic modulus measurement. Monsanto Rheometer is an oscillating disc rheometer operating at a strain rate of 3 cycles per minute.

EXAMPLE VI

The following formulas are prepared for a comparative evaluation as a cut thread. Example 6 A, Table II, shows a polyurethane elastomer prepared using zinc chloride:MBTS complex with cadmium stearate, while Example 6 B in Table II shows a similar elastomer prepared with a zinc chloride:Fatty acid salt complex of this invention. The polyester based polyurethane is similar to that described in Example V.

TABLE II

| Component | 6 A | 6 B |
|---|---|---|
| Polyester based polyurethane | 100 | 100 |
| Stearic acid | 0.5 | 0.5 |
| Whitetex Clay (aluminum silicate) | 15 | 15 |
| Unitane 0-220 (Titanium dioxide) | 10 | 10 |
| MBTS | 4 | 4 |
| MBT | 2 | 2 |
| Sulfur | 2 | 2 |
| Zinc chloride:MBTS complex | 1 | — |
| Cadmium stearate | 0.5 | — |
| Zinc chloride composition of Example IV | — | 1.25 |

The above formulations are cured 45 minutes at 287°F. The vulcanizates exhibit mechanical properties similar to those of Example V. A comparison of the Yellow Index (I) of the two compositions, 6 A=14.70, 6 B=10.71, illustrates the lower and superior color of the composition made using the activator of this invention, i.e., formula 6 B above.

(I) Yellow Index = 70(1 - blue/green)
as measured on a differential colorimeter ("Colormaster").

EXAMPLE VII

A polyether based polyurethane is prepared by mixing 522 parts of 2,4-toluene diisocyanate with 119 parts of 3-(allyloxy)-1,2-propanediol and 2,000 parts of polytetramethylene ether glycol having an average molecular weight of 1,000 to form a polyether based polyurethane having 1 side chain unsaturation per 2650 units of molecular weight.

A polyurethane based formula is prepared with the following components:

| Components | Parts |
|---|---|
| Polyether based polyurethane described above | 100 |
| SAF Carbon Black | 30 |
| Stearic acid | 0.5 |
| Sulfur | 2.0 |
| MBTS | 3.0 |
| MBT | 3.0 |
| ZnCl$_2$ composition of Example III | 1.75 |

The formulation is cured for 45 minutes at 287°F. The mechanical and physical properties of the resultant cured elastomer are similar to that of Example 5 D.

What is claimed is:

1. A method of vulcanizing a sulfur-vulcanizable polyurethane elastomer containing pendant non-benzenoid unsaturation which comprises mixing with each 100 parts by weight of said polyurethane (a) from about 0.5 part to about 3.0 parts by weight sulfur, (b) from about 2.5 parts to about 7.0 parts by weight of one or a combination of accelerators selected from the group consisting of 2-mercaptobenzothiazole, 2,2'-dithiobisbenzothiazole and 2-mercaptothiazoline, and (c) from about 0.5 part to about 5.0 parts by weight of a non-hygroscopic zinc halide composition comprising an anhydrous zinc halide selected from the group consisting of zinc chloride, zinc bromide and zinc iodide in intimate combination with from about 1 part to about 10 parts per part of zinc halide of a fatty acid or fatty acid soap containing from 8 to 20 carbon atoms, and heating to a temperature sufficient to effect vulcanization.

2. The method of vulcanizing a sulfur-vulcanizable polyurethane elastomer according to claim 1 wherein the non-hygroscopic zinc halide composition comprises zinc chloride in intimate combination with zinc stearate.

3. The method of vulcanizing a sulfur-vulcanizable polyurethane elastomer according to claim 1 wherein from 1 to 3 parts of zinc oxide per part of zinc halide is intimately combined with the non-hygroscopic zinc halide composition prior to mixing with the polyurethane elastomer.

4. A non-hygroscopic zinc halide composition for the activation of sulfur-vulcanization of a vulcanizable polyurethane elastomer containing pendant non-benzenoid unsaturation comprising an anhydrous zinc halide selected from the group consisting of zinc bromide, zinc chloride and zinc iodide in intimate combination with from about 1 to about 10 parts per part of the zinc halide of a fatty acid or fatty acid soap containing from 8 to 20 carbon atoms.

5. The non-hygroscopic zinc halide composition according to claim 4 wherein the zinc halide is zinc chloride and the fatty acid soap is zinc stearate.

* * * * *